(12) United States Patent
Okada

(10) Patent No.: US 8,593,399 B2
(45) Date of Patent: Nov. 26, 2013

(54) INTERFACE APPARATUS AND METHOD FOR CONTROLLING A DEVICE

(75) Inventor: Ryuzo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 13/201,643

(22) PCT Filed: Dec. 14, 2009

(86) PCT No.: PCT/JP2009/006846
§ 371 (c)(1),
(2), (4) Date: Oct. 6, 2011

(87) PCT Pub. No.: WO2010/095204
PCT Pub. Date: Aug. 26, 2010

(65) Prior Publication Data
US 2012/0026083 A1    Feb. 2, 2012

(30) Foreign Application Priority Data
Feb. 18, 2009  (JP) ................. 2009-035578

(51) Int. Cl.
*G09G 5/00*  (2006.01)
(52) U.S. Cl.
USPC .......................................... 345/156
(58) Field of Classification Search
USPC ............................... 345/158, 156
See application file for complete search history.

(56) References Cited

U.S. PATENT DOCUMENTS

| | | | |
|---|---|---|---|
| 5,594,469 A | 1/1997 | Freeman et al. | |
| 2008/0016544 A1* | 1/2008 | Lee et al. | 725/134 |
| 2008/0052643 A1 | 2/2008 | Ike et al. | |
| 2008/0141181 A1 | 6/2008 | Ishigaki et al. | |
| 2010/0040292 A1* | 2/2010 | Clarkson | 382/201 |

FOREIGN PATENT DOCUMENTS

| | | |
|---|---|---|
| JP | 09-185456 | 7/1997 |
| JP | 2002-083302 | 3/2002 |
| WO | 2007029393 A1 | 3/2007 |

OTHER PUBLICATIONS

International Search Report for International Application No. PCT/JP2009/006846 mailed on Mar. 16, 2010.

* cited by examiner

*Primary Examiner* — Quan-Zhen Wang
*Assistant Examiner* — Tony Davis
(74) *Attorney, Agent, or Firm* — Turocy & Watson, LLP

(57) ABSTRACT

A specific site of a user's body is detected from an input image, it is detected on the basis of a moving speed and a moving direction of the specific site whether the specific site makes a feeding motion in which the specific site moves in any direction, and when the feeding motion is detected, a control command for a device is changed.

13 Claims, 12 Drawing Sheets

FIG. 4

| PRESENT HIGH-SPEED MOVEMENT | JUST-BEFORE HIGH-SPEED MOVEMENT | INTERSECTION ANGLE | JUST-BEFORE STATE | DETERMINATION |
|---|---|---|---|---|
| PRESENCE | NO | — | * | FEEDING MOTION |
| PRESENCE | PRESENCE | $\theta > \theta 1$ | ~~RETURN~~ | ~~FEEDING MOTION~~ |
| PRESENCE | PRESENCE | $\theta > \theta 1$ | FEEDING | RETURN MOTION |
| NO | NO | — | FEEDING OR RETURN | TERMINATION OF MOTION |

INTERFACE APPARATUS AND METHOD FOR CONTROLLING A DEVICE

TECHNICAL FIELD

The present invention relates to an interface apparatus for controlling a device by action of a specific site of a user, and a method for the same.

BACKGROUND ART

With respect to a conventional interface apparatus, when an device is operated, a specific site of a body (for example, a hand) which is obtained by image processing is positionally superimposed on a specific area (icon) disposed within an operation screen for controlling the device to execute the command corresponding to the icon as disclosed in Patent Document 1.

Furthermore, as disclosed in Patent Document 2, actions in plural narrow areas of an image obtained by imaging a user are observed, and when an action is observed in an area, the command corresponding to each area is executed.

Furthermore, in Patent Document 3, a specific hand shape is allocated to each icon, and a command allocated to the icon corresponding to a hand shape detected through image recognition is executed.

PRIOR ART DOCUMENT

Patent Document

Patent Document 1: Japanese Patent No. 2,941,207
Patent Document 2: JP-A-2002-83302
Patent Document 3: Japanese Patent No. 3,777,650

SUMMARY OF THE INVENTION

Problem to be Solved by the Invention

However, the conventional technique has a problem that a complicated motion is required to a user's specific site.

Therefore, the present invention has an object to provide an interface apparatus controlling a device that can change a control command by a user's simple motion, and a method for the interface apparatus controlling a device.

Means of Solving the Problem

An interface apparatus controlling a device according to receive an input image, and a first aspect of the present invention includes a feeding motion detecting unit configured to detect a moving speed and a moving direction of a specific site of a user's body from the input image and to detect on the basis of the moving speed and the moving direction whether a motion of the specific site is a feeding motion or not, and a main controlling unit configured to change a control command of a control target apparatus when the feeding motion is detected.

Advantage of the Invention

According to the present invention, the control command can be varied by a user's simple motion.

BRIEF DESCRIPTION OF THE DRAWINGS

FIG. 4 is a diagram showing a determination condition in a motion determining unit.

MODES FOR CARRYING OUT THE INVENTION

Figure 1:
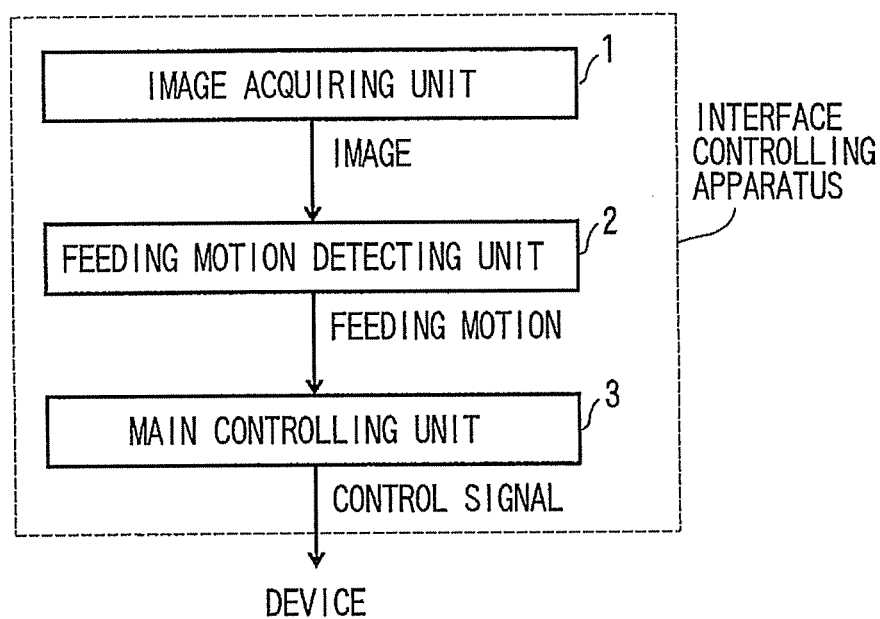
FIG. 1 is a block diagram showing a controlling apparatus according to an embodiment 1.

An interface controlling apparatus (hereinafter merely referred to as "controlling apparatus") according to an embodiment of the present invention will be described with reference to the drawings. The constructions and processing which make the same motions are represented by common reference numerals, and duplicative description thereof is omitted.

Embodiment 1

The controlling apparatus according to the embodiment 1 will be described with reference to FIGS. 1 to 10.

Figure 2:
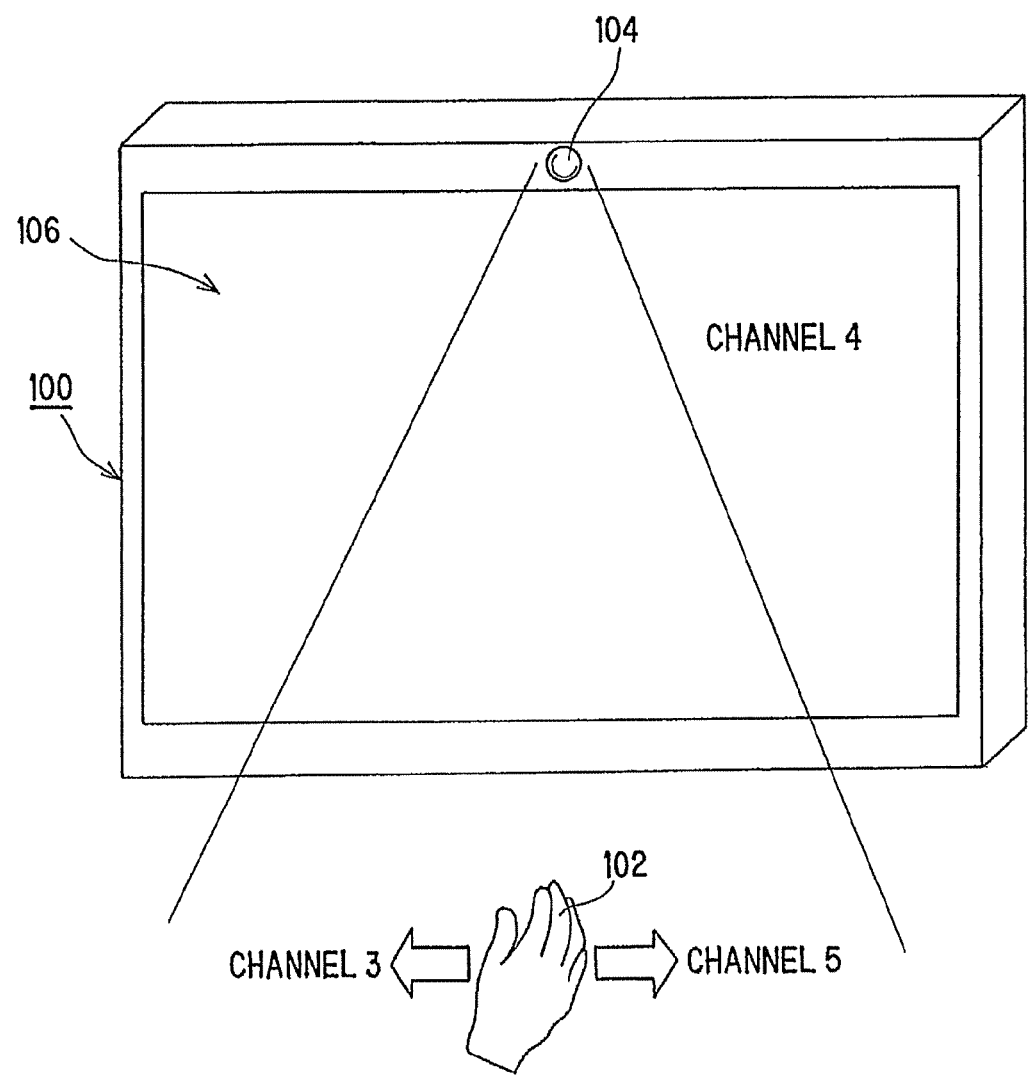
FIG. 2 is a diagram showing an example in which the controlling apparatus of the embodiment 1 is applied to a television receiving apparatus.

In this embodiment, a device, that is a control target apparatus, is a television receiving apparatus 100 and an example of the controlling apparatus which operates a channel of the television receiving apparatus 100 by means of gestures of a user's hand 102. FIG. 2 is a schematic diagram showing this example. When a user executes a leftward feeding motion, the channel is decremented by one, and when the user executes a rightward feeding motion, the channel is increased by one.

FIG. 1 is a block diagram showing the construction of the controlling apparatus according to this embodiment.

The controlling apparatus has a feeding motion detecting unit 2 and a main controlling unit 3. An image acquiring unit 1 may be provided inside the controlling apparatus or may be provided at the outside of the controlling apparatus.

The image acquiring unit 1 takes time-sequential images of the user with an imaging apparatus 104, and acquires these images. The imaging apparatus 104 is fixed to the television receiving apparatus 100 as shown in FIG. 2.

The feeding motion detecting unit 2 analyzes the time-sequential images to detect the action of the user's hand 102 as "feeding motion".

The main controlling unit 3 changes the channel displayed on a screen 106 in accordance with the detected feeding motion.

Figure 3:
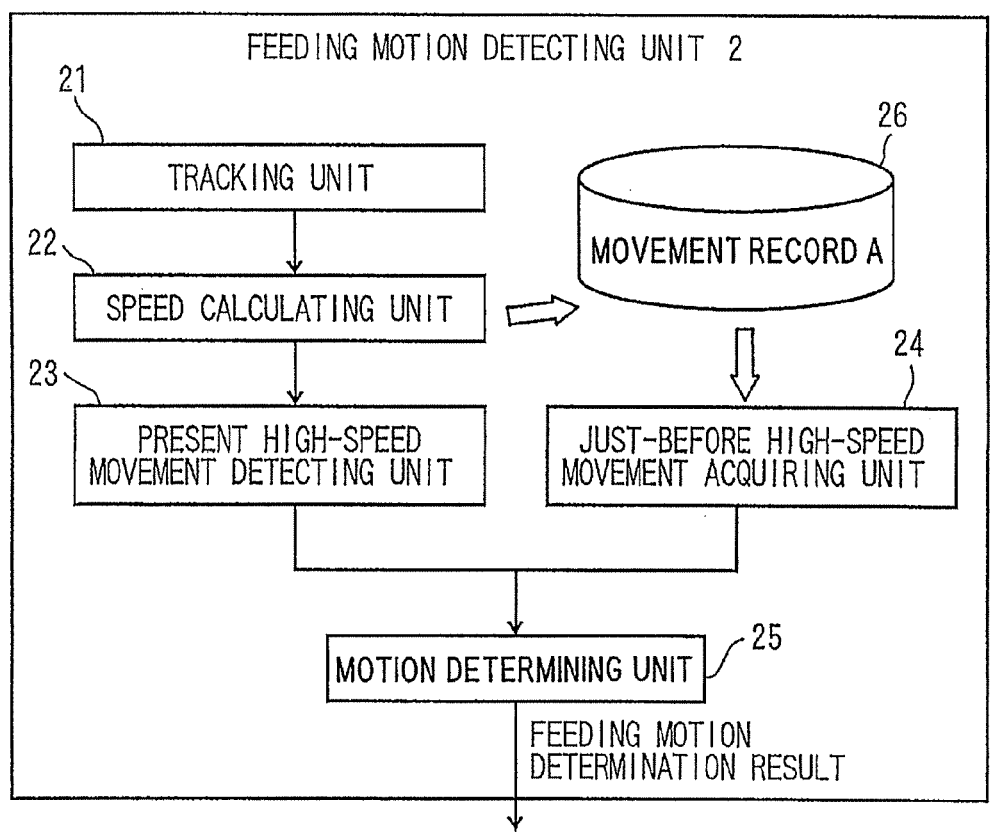
FIG. 3 is a block diagram showing the construction of a feeding motion detecting unit.

Next, the construction of the feeding motion detecting unit 2 will be described with reference to FIG. 3. FIG. 3 is a block diagram showing the feeding motion detecting unit 2.

The feeding motion detecting unit 2 has a tracking unit 21, a speed calculating unit 22, a present high-speed movement detecting unit 23, a just-before high-speed movement detecting unit 24 and a motion determining unit 25. A storage unit 26 may be provided in the feeding motion detecting unit 2 or may be connected to the outside.

The tracking unit 21 applies a pattern recognition method disclosed in JP-A-2006-268825, a background difference method disclosed in Japanese Patent No. 3,777,650 or a flesh-color difference method, an inter-frame difference method and a method based on the combination of these methods to time-series images took with the image acquiring unit 1 to detect a user's specific site such as a hand, a face or the like every image to track the specific site time-sequentially.

The speed calculating unit 22 calculates a hand's moving speed within the images on the basis of the tracking result corresponding to the time-series images. The following methods may be used as the method of calculating the hand's speed which is executed by the speed calculating unit 22.

A first method calculates the speed of the specific site on the basis of a differential value (inter-frame differential value) at a position within the images of the hand which are obtained by the tracking unit 21.

A second method calculates the speeds of respective pixels (optical flow) at positional peripheries of a specific site within the images obtained by the tracking unit 21 and setting the average value or the mode value thereof as the speed of the specific site.

A third method sets, as an observation value, the position of the hand within the images obtained by the tracking unit 21, sets the position and speed of the hand as state variables, and calculates the speed of the specific site by a filter such as Kalman filter for estimating the optimum state on the basis of the observation value and a movement model based on the state variables such as a uniform movement or the like. The average value of the speeds of pixels (optical flow) at the positional peripheries of the specific site within the images may be further used as an observation value.

On the basis of a reference speed V0, the present high-speed movement detecting unit 23 detects a present high-speed movement vc which is the present motion of the specific site and represented by a vector. That is, when the absolute value of the present speed of the specific site is higher than the reference speed V0, the present high-speed movement detecting unit 23 determines that the present high-speed movement vc exists, and when the absolute value of the present speed of the specific site is lower than the reference speed V0, the present high-speed movement detecting unit 23 determines that no present high-speed movement vc exists. The sped and time information (the frame number of the image) as the information of the present high-speed movement vc are stored as a movement record A in the storage unit 26.

The just-before high-speed movement detecting unit 24 obtains a past present high-speed movement vc detected before a fixed time from the present time as a just-before high-speed movement vp on the basis of the movement record A stored in the storage unit 26. Here, "before the fixed time" means a time before one to ten frames or a time before 0.01 to 0.1 second.

The motion determining unit 25 makes the determination shown in FIG. 4 from the information of the present high-speed movement vc and the just-before high-speed movement vp to detect the feeding motion. That is, as shown in FIG. 4, the determination of the motion determining unit 25 is divided into four determination patterns. The "feeding motion" is a high-speed movement of the specific site in a predetermined direction such as upward, downward, leftward and rightward directions and a combination thereof, and "return motion" is a motion of returning the specific site in an original position direction after the feeding motion.

According to a first determination pattern, when the present high-speed movement vc is detected and no just-before high-speed movement vp exists, the present state is determined as the feeding motion.

According to a second determination pattern, when the present high-speed movement vc and the just-before high-speed movement vp exist, the intersection angle θ between the direction of the present high-speed movement vc and the direction of the just-before high-speed movement vp is larger than a first reference angle θ1 and the just-before state is the return motion, the present state is determined as the feeding motion.

According to a third determination pattern, when the present high-speed movement vc and the just-before high-speed movement vp exist, the intersection angle θ between the direction of the present high-speed movement vc and the direction of the just-before high-speed movement vp is larger than the first reference angle θ1 and the just-before state is the feeding motion, the present state is determined as the return motion.

According to a fourth pattern, when neither the present high-speed movement vc nor the just-before high-speed movement vp exists, and the just-before state is the feeding motion or the return motion, the present state is determined as termination of the motion.

There is no applicable determination pattern, it is determined that the just-before motion state is being continued at present.

Figure 5:
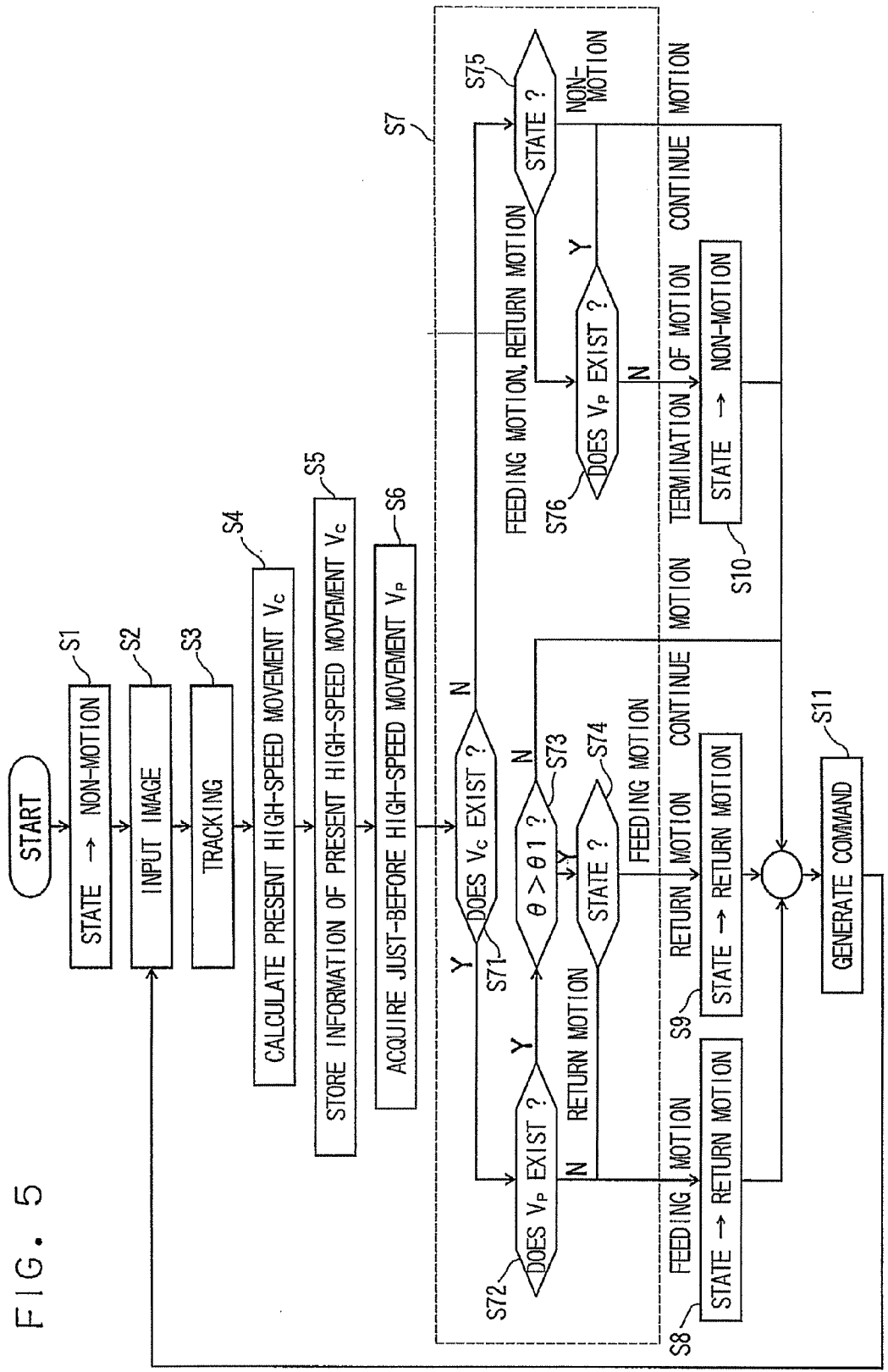
FIG. 5 is a flowchart showing the feeding motion detecting unit.

The processing operation of the feeding motion detecting unit 2 will be described with reference to FIG. 5. FIG. 5 is a processing flowchart of the feeding motion detecting unit 2.

In step S1, the present high-speed movement detecting unit 23 sets the present state to non-motion as initialization processing.

In step S2, the image acquiring unit 1 takes an image of a user and inputs the taken image as a present image.

In step S3, the tracking unit 21 detects a user's specific site on the present image and executes time-sequential tracking processing.

In step S4, the speed calculating unit 22 calculates the speed of the specific site.

In step S5, the present high-speed movement detecting unit 23 detects the present high-speed movement vc on the basis of the reference speed V0. The speed and the time information (the frame number of the image) as the information of the present high-speed movement vc are stored as a movement record A in the storage unit 26.

In step S6, the just-before high-speed movement detecting unit 24 acquires the just-before high-speed movement vp from the movement record A of the storage unit 26. When no just-before high-speed movement vp exists in the movement record A, it is assumed that no just-before high-speed movement vp exists.

In step S7, the motion determining unit 25 executes the motion determination of FIG. 4. It will be described in detail later.

In steps S8, S9, S10, the feeding motion detecting unit 2 shifts the present state in accordance with the determination result of the step S7. These steps will be also described in detail later.

In step S11, when it is determined that the feeding motion occurs, the motion determining unit 25 generate any command to operate a target apparatus.

Next, the operation processing of the motion determining unit 25 will be described with reference to FIG. 4 and FIG. 5.

In step S71, the motion determining unit 25 determines on the basis of the detection status of the present high-speed movement detecting unit 23 whether the present high-speed movement vc exists or not. When the present high-speed movement vc exists, the processing goes to step S72 (in the case of Y), and when no present high-speed movement vc exists, the processing goes to step S75 (in the case of N).

In step S72, the present high-speed movement vc exists and thus the motion determining unit 25 determines on the basis of the acquisition status of the just-before high-speed movement detecting unit 24 whether the just-before high-speed movement vp exists or not. When the just-before high-speed movement vp exists, the processing goes to step S73 (in the case of Y), and when no just-before high-speed movement vp exists, the processing goes to step S8 (in the case of N).

In step S73, the present high-speed movement vc and the just-before high-speed movement vp exist, and thus the motion determining unit 25 compares the intersection angle $\theta$ between the direction of the present high-speed movement vc and the direction of the just-before high-speed movement vp with the first reference angle $\theta 1$. When $\theta > \theta 1$ is satisfied, the processing goes to step S74 (in the case of Y), and when $\theta <= \theta 1$, it is determined that the motion is continued and thus the processing goes to step S11 (in the case of N).

In step S74, since $\theta > \theta 1$ is satisfied, the motion determining unit 25 goes to step S8 when the just-before state is the return motion or goes to step S9 when the just-before state is the feeding motion.

In step S75, since no present high-speed movement vc exists, the motion determining unit 25 goes to step S76 when the just-before state is the feeding motion or the return motion, or when the just-before state is non-motion, the motion determining unit 25 determines that the motion is continued and thus goes to step S11.

In step S76, since no present high-speed movement vc exists and the just-before state is the feeding motion or the return motion, the motion determining unit 25 determines on the basis of the acquisition status of the just-before high-speed movement detecting unit 24 whether the just-before high-speed movement vp exists or not. When the just-before high-speed movement vp exists, the motion determining unit 25 goes to step S10 (in the case of N), and when no just-before high-speed movement vp exists, the motion determining unit 25 determines that the motion is continued and thus goes to step S11 (in the case of Y).

In step S8, the motion determining unit 25 determines that the present state is the feeding motion, and thus goes to step S11. Furthermore, it stores this present state as the movement record A into the storage unit 26. This step corresponds to the first and second determination patterns of FIG. 4.

In step S9, the motion determining unit 25 determines that the present state is the return motion, and thus goes to step S11. Furthermore, it stores this present state as the movement record A into the storage unit 26. This step corresponds to the third determination pattern of FIG. 4.

In step S10, the motion determining unit 25 determines that the present state is the non-motion, and thus goes to step S11. Furthermore, it stores this present state as the movement record A into the storage unit 26. This step corresponds to the fourth determination pattern of FIG. 4.

The operation of the feeding motion detecting unit 2 will be described in order.

First, the feeding motion is detected when the specific site starts a high-speed movement, and it is determined that the feeding motion is continued during a period when the high-speed movement is kept in the same direction.

Secondly, when the direction of the high-speed movement is varied to the opposite direction ($\theta > \theta 1$) with keeping the high-speed movement, it is determined as the return movement, and it is determined that the return motion is continued during a period when the high-speed movement is kept in the same direction.

Thirdly, when the direction of the high-speed movement is further varied to the opposite direction ($\theta > \theta 1$) from the state of the return movement with keeping the high-speed movement, it is determined as the feeding motion again.

Fourthly, it is assumed that a fixed time elapses after the feeding motion or the return motion is executed and the high-speed movement is not observed. In this case, it is determined that the high-speed movement has not been observed at present and within the past fixed time and thus the motion is terminated.

Fifthly, when the high-speed movement is not observed without change, it is determined that the state of the termination of the motion is continued. Through the above operations, the feeding motion detecting unit 2 outputs, as a feeding motion determination result, the presence or absence of the feeding motion in the present image and the direction, the motion speed, etc. as attributes when the feeding motion exists.

Next, the construction of the main controlling unit 3 will be described.

The main controlling unit 3 switches a currently selected channel to another channel in accordance with the direction of the feeding motion detected by the feeding motion detecting unit 2.

For example as shown in FIG. 2, when a rightward feeding motion is detected by the feeding motion detecting unit 2, the main controlling unit 3 switches the currently selected channel 4 to a channel 5.

Furthermore, a sound volume, etc. may be adjusted in addition to the channel.

According to this embodiment, the channel of the television receiving apparatus 100 can be easily operated by the feeding motion of the user's hand 102.

Embodiment 2

A controlling apparatus according to an embodiment 2 will be described with reference to FIGS. 7 to 10.

Figure 8:
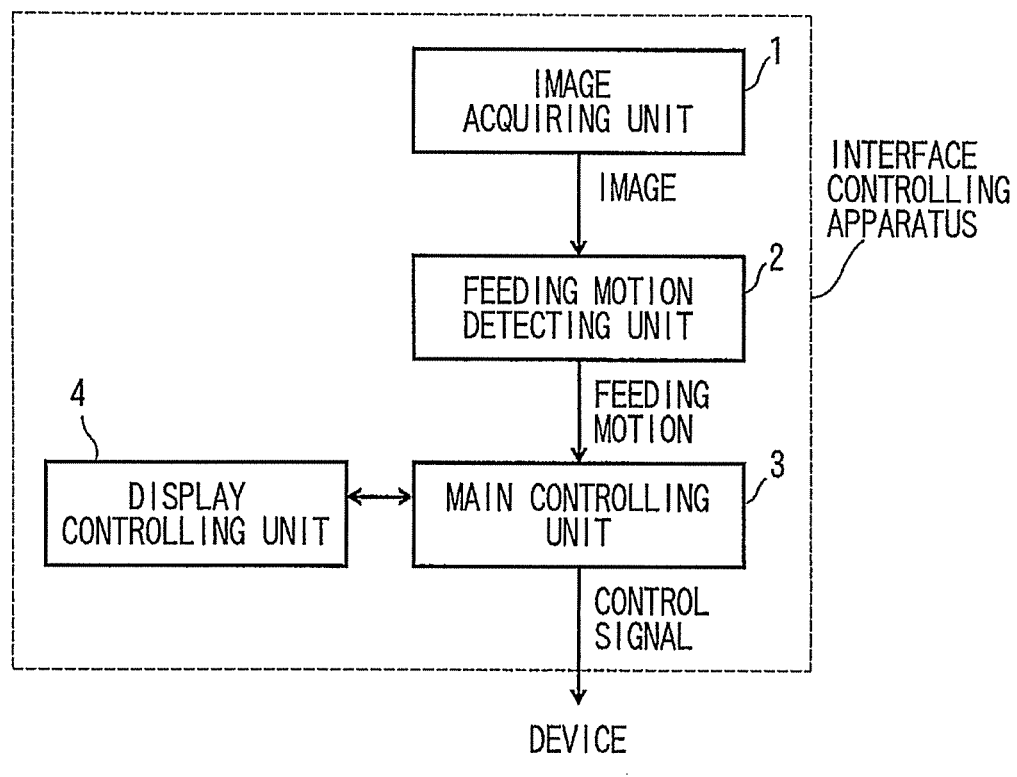
FIG. 8 is a block diagram showing a controlling apparatus according to an embodiment 2.

FIG. 8 is a block diagram showing the construction of the controlling apparatus according to this embodiment.

As shown in FIG. 8, as in the case of the embodiment 1, the controlling apparatus has a feeding motion detecting unit 2, a main controlling unit 3 and a display controlling unit 4. The image acquiring unit 1 may be provided in the controlling apparatus or provided to the outside.

Figure 7:
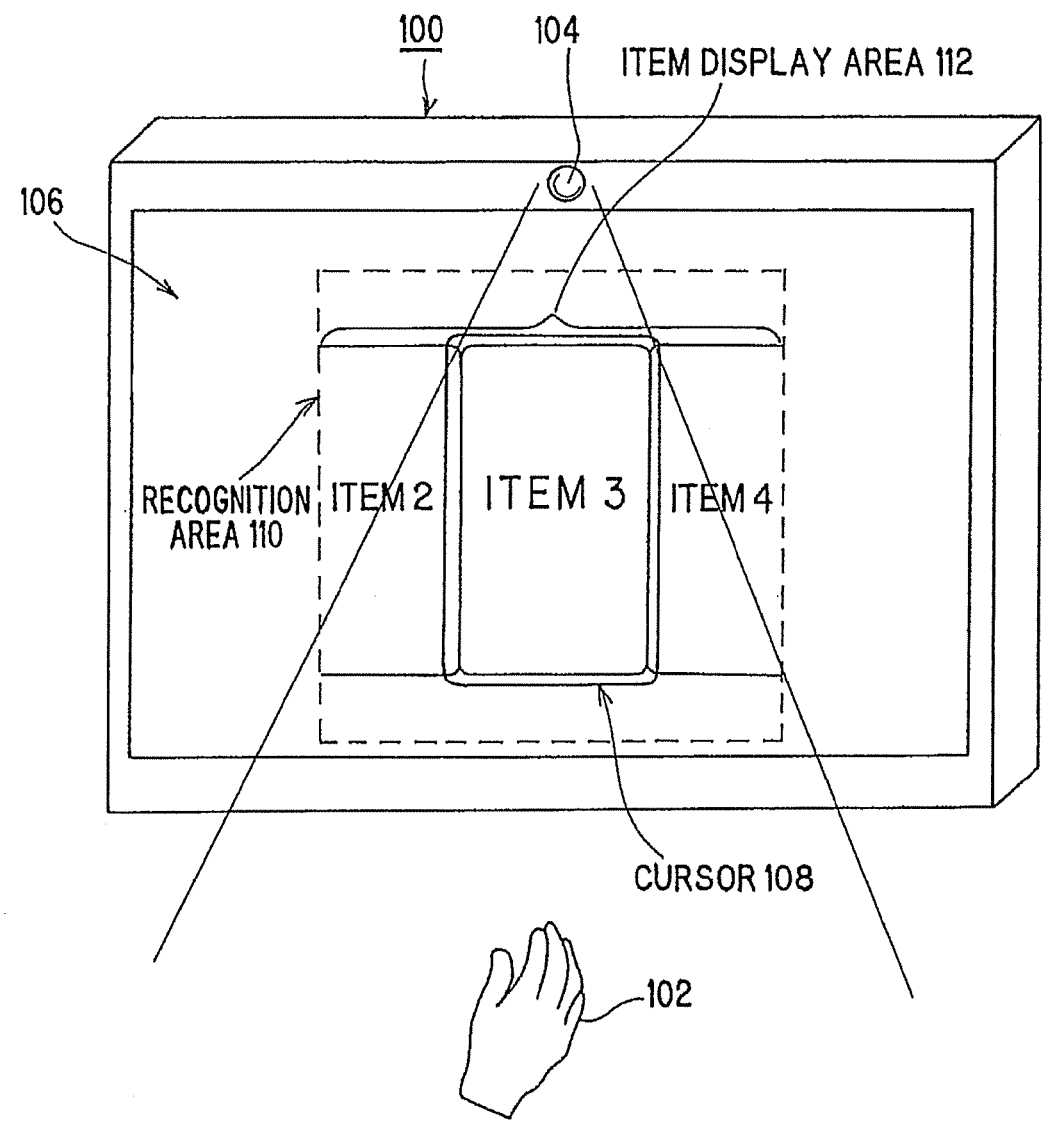
FIG. 7 is a diagram showing a brief overview of the controlling apparatus when feedback is executed by using a screen display which is watched by a user.

As shown in FIG. 7, the display controlling unit 4 displays an item display area 112 and a cursor 108 representing a currently selected item on a screen 106 of a displaying apparatus 200 of a computer which is watched by a user, and also it sets an area broader than the item display area 112 as a recognition area 110. Here, "item" is an area to which control commands for a device are allocated. The item display area 112 is an area for displaying all or a part of items selectable by the user. The recognition area 110 is a range in which the shape or moving state of a user's specific site can be recognized by the controlling apparatus, and this area is actually set under a state that the user cannot watch it although this area is represented by a dashed line in FIG. 7.

The main controlling unit 3 converts the position of the hand 102 in the image obtained by the tracking unit 21 to the coordinate system of the screen 106 which the user watches. When the converted position is located within the recognition area 110, the control concerning the item contained in the recognition area 110 is performed in accordance with the feeding motion.

That is, in the main controlling unit 3, items are displayed on the screen 106 so as to be enumerated in the right-and-left direction in turn, and an item adjacent to a currently selected item is selected in accordance with the direction of the feeding motion detected by the feeding motion detecting unit 2. For example, when the rightward feeding motion is detected by the feeding motion detecting unit 2, the cursor 108 is switched to the item at the just right side of the currently selected item in the main controlling unit 3.

The arrangement of the items may be set on the two-dimensional plane of the screen 106 so that the items are arranged in the up-and-down and right-and-left directions, annularly or spherically.

With respect to the items, items representing different control commands (for example, a menu of "file", "edition", "display" of software executed by a computer or the like) may be arranged.

According to this embodiment, an item display area 112 and the cursor 108 are displayed on the screen 106, whereby the control command can be fed back to the user.

An item may be selected when the user's hand 102 is located the recognition area 110 irrespective of the locating position of the user's hand 102 within the recognition area 110.

Therefore, according to this embodiment, the operation by the user can be further simplified.

Next, a modification of this embodiment will be described.

Figure 9:
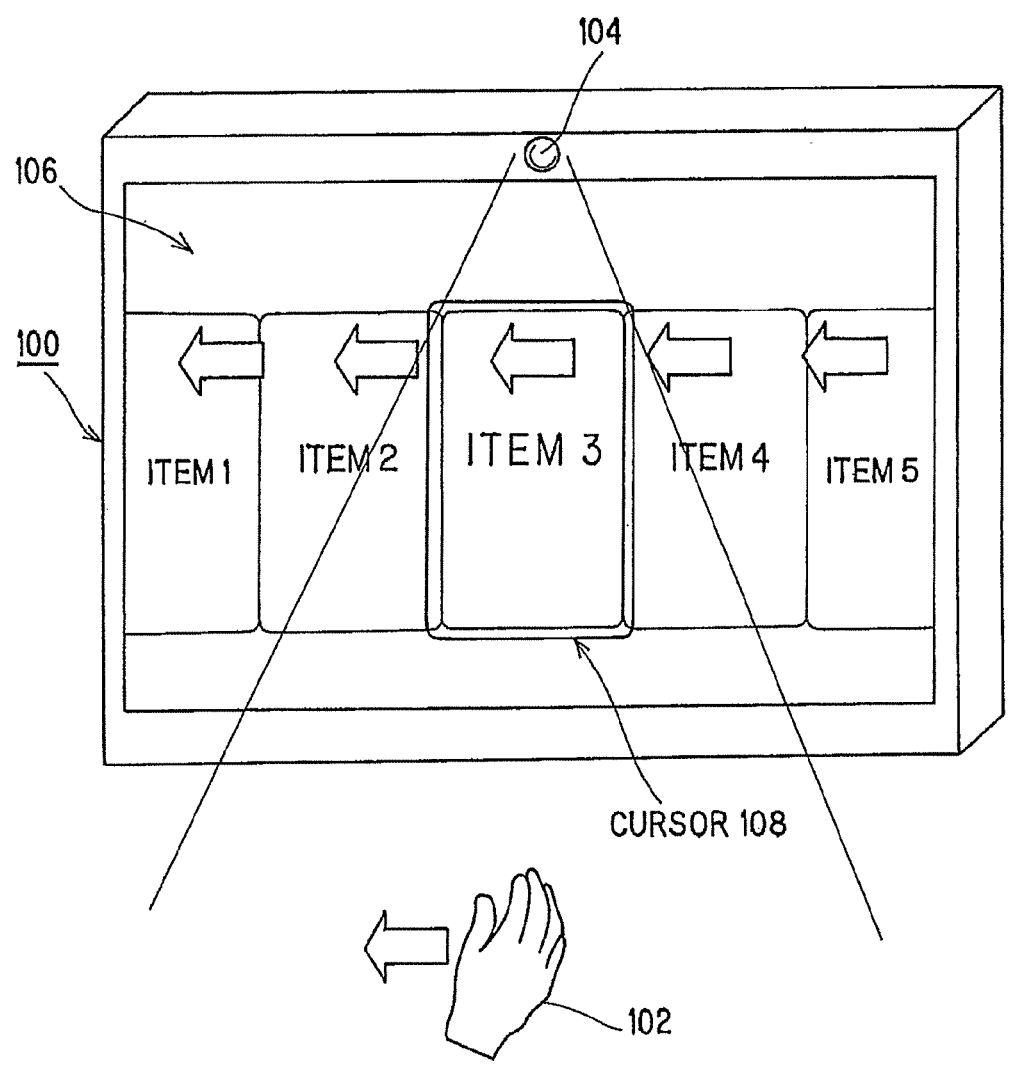
FIG. 9 is a diagram when a screen display for moving an item is executed.

In a modification 1, a method of displaying the item display area 112 and the cursor 108 is changed as shown in FIG. 9. That is, the cursor 108 is displayed at a fixed position, and the item display is moved in the feeding motion direction. The cursor 108 may be moved in the feeding motion direction while the item display is fixed.

In a modification 2, the display of the item display area 112 and the cursor 108 as shown in the modification 1 is not executed, and a selected item may be displayed at the center portion at all times. In this case, the item display is moved in the feeding motion direction.

Figure 6:
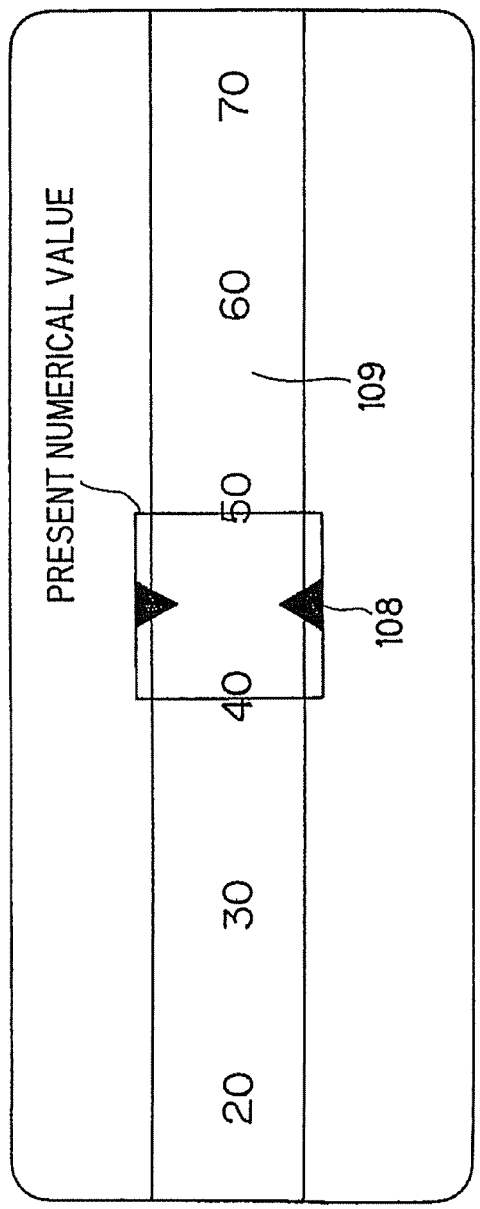
FIG. 6 is a diagram showing an example of an item when sequential numerical values are used.

In a modification 3, a scale image corresponding numerical values representing items is displayed as shown in FIG. 6 to perform control requiring sequential values. In this case, scales representing the numerical values are displayed at any intervals on a belt-shaped scale image 109, and the cursor 108 is fixed at the center. By the feeding motion, the position corresponding to a numerical value which is desired to be selected is moved to the center portion and selected.

In a modification 4, in order to improve convenience for users when many items are treated, the items are classified into plural item groups. The display controlling unit 4 has an item display area 112 every item group, and sets a broader recognition area 110 than each item display area 112. When a position obtained when the position of the hand 102 within an image is converted to the coordinate system of the screen 106 is within the recognition area 110, the main controlling unit 3 performs selection concerning the corresponding item group. Accordingly, the user moves the hand 102 to select an item group which the user wants to control, whereby the user can operate the corresponding item group even when the user's hand 102 is located at anyplace within each recognition area 110.

Figure 10:
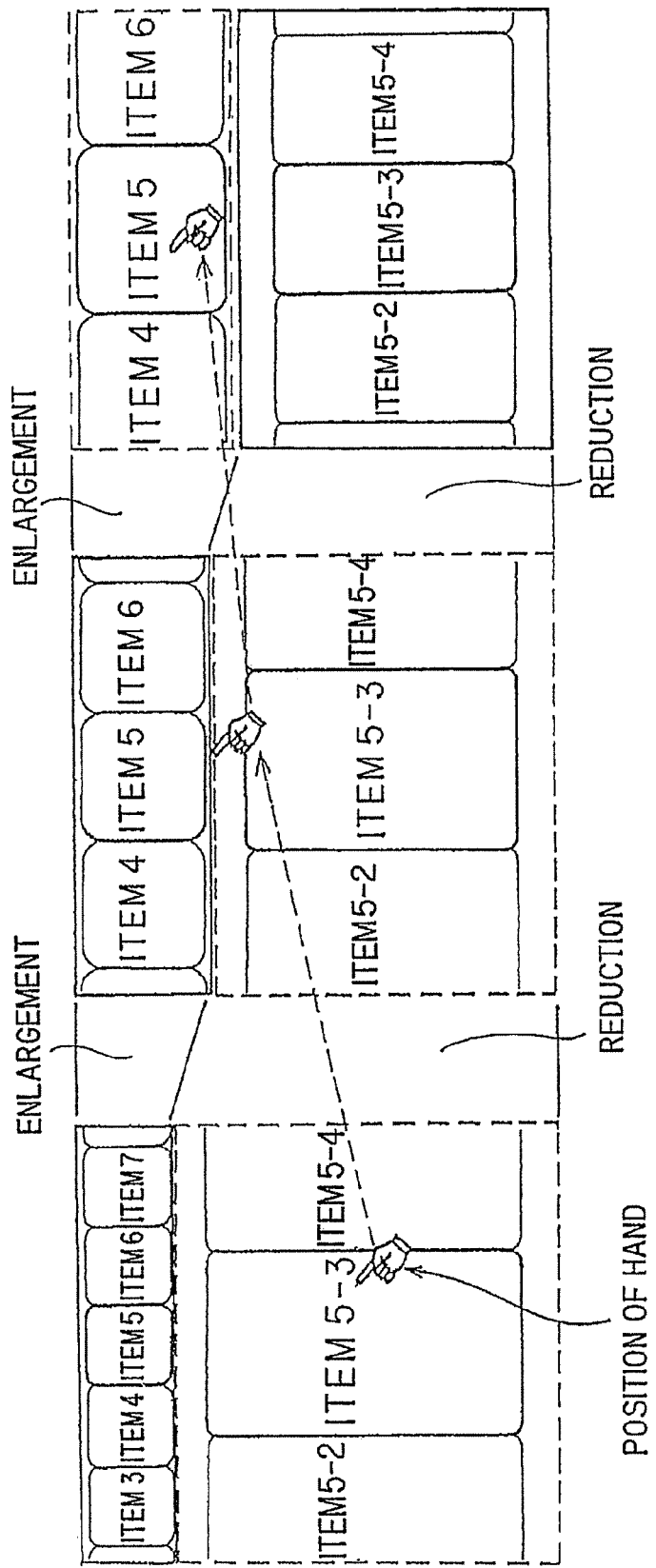
FIG. 10 is a diagram showing a screen display method when plural item groups are used.

In a modification 5, as shown in FIG. 10, when an item group is to be selected, the operation by the position of the user's hand 102 is made easy. That is, when the position obtained when the position of the user's hand 102 is converted to the coordinate system of the screen 106 approaches to some item display area 112, the display controlling unit 4 displays the corresponding item display area 112 or recognition area 110 while enlarging the item display area 112 or the recognition area 110. Accordingly, when the user selects an item group, the moving amount of the hand 102 can be reduced, and thus the item group can be easily selected.

Embodiment 3

A controlling apparatus according to an embodiment 3 will be described with reference to FIG. 11.

Figure 11:
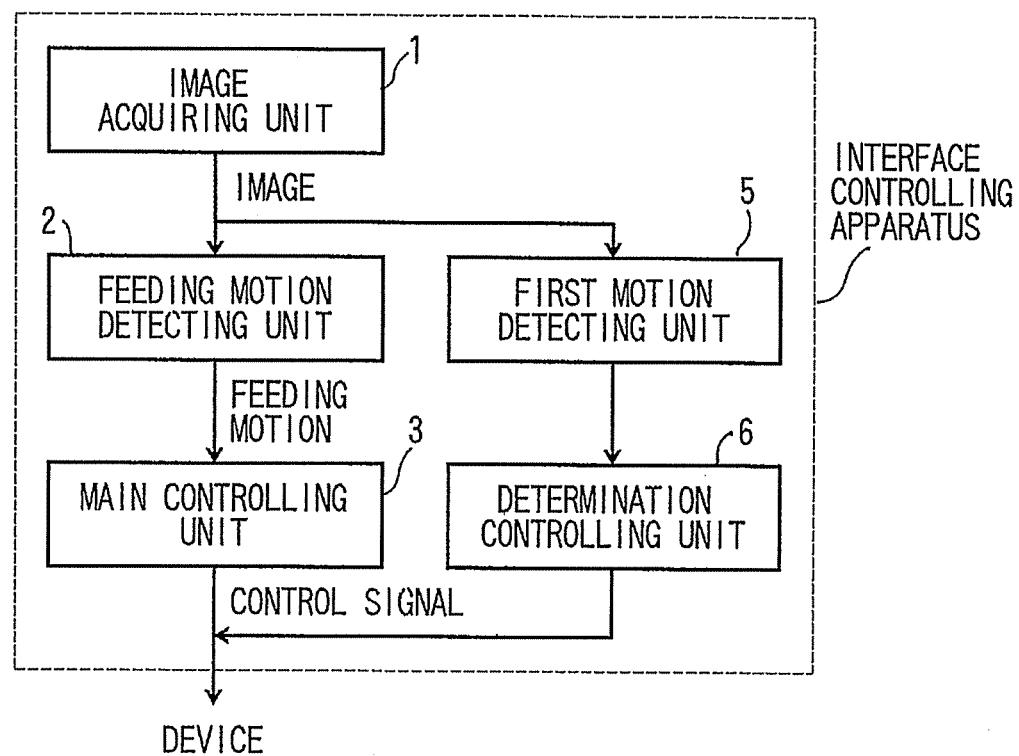
FIG. 11 is a block diagram showing a controlling apparatus according to an embodiment 3.

FIG. 11 is a block diagram showing the construction of the controlling apparatus according to this embodiment.

The controlling apparatus according to this embodiment has a feeding motion detecting unit 2 and a main controlling unit 3 as in the case of the embodiment 1, and further has a first motion detecting unit 5 and a determination controlling unit 6. The image acquiring unit 1 may be provided in the controlling apparatus or provided to the outside.

The first motion detecting unit 5 detects a specific site with a predetermined shape or predetermined movement thereof being set as a determination motion, and detects the determination motion irrespective of the position of the specific site within the image.

When the determination motion is detected, the determination controlling unit 6 sets an item currently selected by the main controlling unit 3 as a determined item, and generates a command allocated to the item concerned.

The description thereof the image acquiring unit 1, the feeding motion detecting unit 2 and the main controlling unit 3 is omitted because they are the same as the embodiment 1. In the following description, the constructions of the first motion detecting unit 5 and the determination controlling unit 6 will be described while the specific site of the user is set as the hand 102.

By using an image recognition method such as the pattern recognition method (see JP-A-2006-268825), an contour shape matching method (see Patent Document 1) or the like, the first motion detecting unit 5 detects whether the user's hand 102 has a first specific shape or not. A state that a fist is made by the hand 102, an OK sign or the like may be used as the first specific shape.

When the specific shape of the hand 102 is detected by the first motion detecting unit 5, The determination controlling unit 6 sets an item currently selected in the main controlling unit 3 to a determination item, and executes the control associated with the determination item concerned on a device.

According to this embodiment, the user successively moves the items by the feeding motion, and sets his/her hand 102 to a specific shape under the state that a desired item is selected, whereby the control command can be easily determined irrespective of the position of the hand even when the hand 102 is located at any place within the screen.

Embodiment 4

A controlling apparatus according to an embodiment 4 will be described with reference to FIG. 12.

Figure 12:
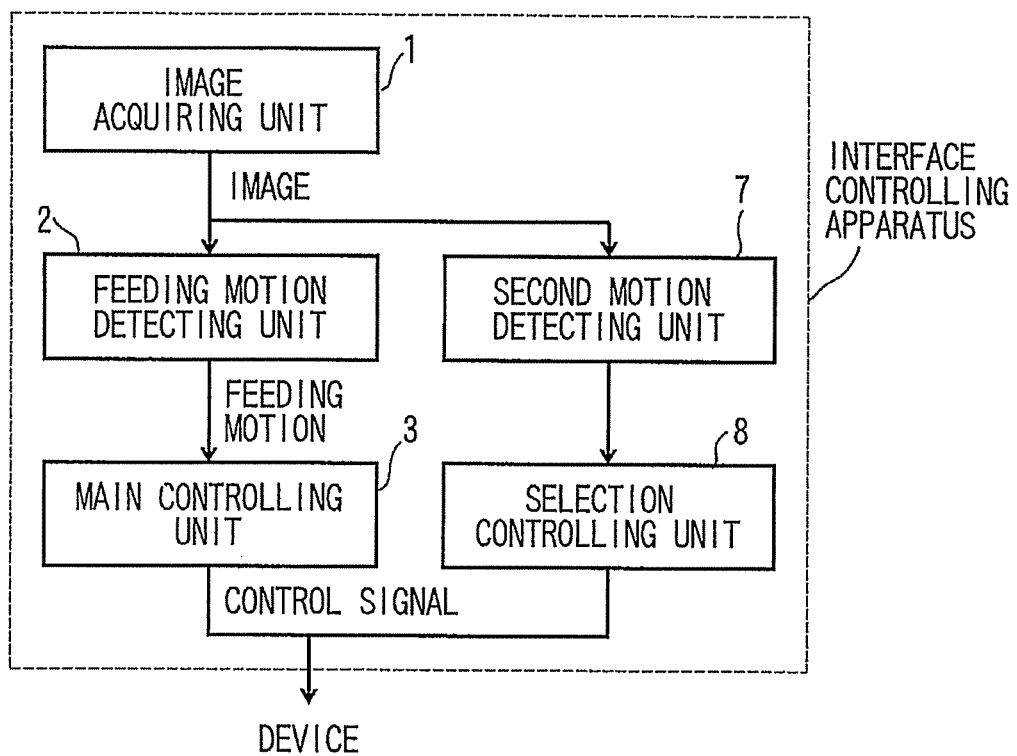
FIG. 12 is a block diagram showing a controlling apparatus according to an embodiment 4.

FIG. 12 is a block diagram showing the construction of the controlling apparatus according to this embodiment.

As in the case of the embodiment 1, the controlling apparatus according to this embodiment has the feeding motion detecting unit 2 and the main controlling unit 3, and further has a second motion detecting unit 6 and a selection controlling unit 7. The image acquiring unit 1 may be provided in the controlling apparatus or provided to the outside.

The second motion detecting unit 6 detects as a drag motion a movement of the hand 102 under the state that the hand 102 keeps a second specific shape. A state that a fist is made by the hand or the like is used as the second specific shape.

When the drag motion is detected in the second motion detecting unit 6, the selection controlling unit 7 changes the currently selected item to another item in accordance with the moving amount, moving speed and moving direction of the hand 102. In this case, the item display area may be moved or the cursor 108 may be moved.

The image acquiring unit 1, the feeding motion detecting unit 2 and the main controlling unit 3 are the same as the embodiment 1, and thus the description thereof is omitted. In the following description, the second motion detecting unit 6 and the selection controlling unit 7 will be described by assuming the user's specific site as the hand 102.

As in the case of the first motion detecting unit 5, the second motion detecting unit 6 detects whether the user's hand 102 has a specific shape and tracks the user's hand 102 according to the image recognition method such as the pattern recognition method, the contour shape matching method or the like, and acquires the moving speed and moving direction thereof by the same method as the speed calculating unit 22. When the user's hand 102 has a specific shape and further it moves within an image, it is detected as the drag motion and also the moving speed and moving direction thereof are output.

As in the case of the main controlling unit 3, when items selectable by the user are arranged and the drag motion is detected by the second motion detecting unit 6, the second determination controlling unit 7 selects an item adjacent to a currently selected item according to the direction and magnitude of the drag motion.

When feedback is executed on the user with the screen display of the displaying apparatus of the computer as shown in FIG. 7, the item display area 112 may be moved by the drag motion or the cursor 108 may be moved as in the case of the embodiment 2.

Modifications

The present invention is not limited to the above embodiments, and various modifications may be made without departing from the subject matter of the present invention. For example, in the embodiments 3 and 4, the display controlling unit 4 as the construction of the embodiment 2 may be added. Furthermore, in each of the embodiments, the description is made by setting the specific site as the hand 102, however, a head or another site may be used. In each of the embodiments, the description is made by adopting the television receiving apparatus 100 and the computer 200 as the device of the controlling apparatus. However, the present invention is not limited to them, and it may be applied to a medical apparatus or another electrical apparatus.

The apparatus as the device of the controlling apparatus may be provided with no displaying unit. For example, it may be applied to a case where a sound volume or tuning is executed in an apparatus having no displaying unit such as a radio receiver or the like. The radio receiver may be provided with an imaging apparatus 104 so that the sound volume or tuning can be performed by user's feeding motion.

The controlling apparatus of each of the above embodiments may be implemented by using a general-purpose computer as basic hardware, for example. That is, the feeding motion detecting unit 2 and the main controlling unit 3 can be implemented by making a processor mounted in the computer execute a program. At this time, the controlling apparatus may be implemented by pre-installing the program into a computer, or by storing the program into a storage medium such as CD-ROM or the like or distributing the program through a network and arbitrarily installing the program into a computer.

DESCRIPTION OF REFERENCE NUMERALS

1 . . . image acquiring unit, 2 . . . feeding motion detecting unit, 3 . . . main controlling unit, 4 . . . display controlling unit, 5 . . . first motion detecting unit, 6 . . . determination controlling unit, 7 . . . second motion detecting unit, 8 . . . selection controlling unit

The invention claimed is:

1. An interface apparatus for controlling a device, comprising:
a feeding motion detecting unit configured to receive input images, to detect a moving speed and a moving direction of a specific site of a user's body from the input images, and to detect whether the motion of the specific site is a feeding motion or not based on the moving speed and the moving direction; and
a main controlling unit configured to change a control command of the device when the feeding motion is detected,
wherein the feeding motion detecting unit comprises:
a present high-speed movement detecting unit configured to determine that the motion of the specific site is a high speed motion when the moving speed of the specific site is greater than a reference speed, and to store a record of the motion of the specific site in a storage unit; and
a motion determining unit configured to determine whether the motion of the specific site is the feeding motion that is at the high speed in a predetermined direction or not.

2. The apparatus according to claim 1, further comprising:
a displaying unit; and
a display controlling unit configured to display, on a screen of the displaying unit, a plurality of items to which control commands are allocated, wherein the main controlling unit selects the item in accordance with the feeding motion.

3. The apparatus according to claim 2, wherein the display controlling unit sets, a recognition area on the screen, an area broader than an item display area in which the item is displayed, and the main controlling unit performs control concerning the item contained in the recognition area in accordance with the feeding motion when a position obtained when a position of the specific site in the image is converted to a coordinate system of the screen is located with the recognition area.

4. The apparatus according to claim 3, wherein the display controlling unit displays the item while enlarging the item when a position obtained when a position of the specific site within the image is converted to a coordinate system of the screen approaches to the item display area.

5. The apparatus according to claim 3, wherein the display controlling unit displays a scale image representing a numerical value corresponding to the item, and the main controlling unit selects a position on the scale image in accordance with the feeding motion.

6. The apparatus according to claim 2, further comprising:
a first motion detecting unit configured to detect a predetermined first specific shape of the specific site to detect a determination motion for the control command; and a determination controlling unit configured to set a selected item as a determined item when the determination motion is detected, and generate the control command allocated to the determined item.

7. The apparatus according to claim 2, further comprising:
a second motion detecting unit configured to detect as a drag motion a state that the specific site moves while keeping a predetermined second specific shape; and
a selection controlling unit configured to change a currently selected item to another item in accordance with a moving amount, a moving speed or a moving direction of the specific site when the drag motion is detected.

8. The apparatus according to claim 2, wherein the plurality of items are classified into item groups.

9. The interface apparatus according to claim 1, wherein the determination unit is configured to determine the motion of the specific site according to an angle between a direction of the motion of the specific site at the high speed and a direction of the motion of the specific site just before the high speed motion.

10. The interface apparatus according to claim 9, wherein the motion determining unit is configured to determine:
that the present state is in the feeding motion if and when the motion of the specific site is at the high speed and a just-before high-speed movement does not exist;
that the present state is in the feeding motion if and when both of the motion of the specific site at the high speed and the just before high speed movement exist said angle is larger than the first reference angle, and the just-before state is the return motion;
that the present state is in the return motion if and when neither of the motion of the specific site at the high speed and the just before high speed movement exists, and the just before state is the feeding motion or the return motion; and
that the just before state continues still now if and when any of the above determination would not be made.

11. The interface apparatus according to claim 9, wherein the motion determining unit is configured to determine:
that the present state is in the feeding motion if and when the motion of the specific site at the high speed exists and the just-before high-speed movement does not exist;
that the present state is in the feeding motion if and when both of the motion of the specific site at the high speed and the just before high speed movement exist said angle is larger than a second reference angle and is smaller than the first reference angle, where the second reference angle is smaller than the first reference angle, and the just-before state is the return motion;
that the present state is in the feeding motion if and when both of the motion of the specific site at the high speed and the just before high speed movement exist, said angle is larger than the first reference angle, and the just before state is the return motion; and
that the just before state continues still now if and when any of the above determination would not be made.

12. The interface apparatus according to claim 1, wherein the present high-speed movement detecting unit is configured to store information regarding whether just before state of the specific site or a state in the just before high speed movement is in the feeding motion or not, or in a return motion in which the specific site is being returned to an original position after the feeding motion or not; and
the motion determining unit is configured to determine whether the present state is in the feeding motion or the return motion, based on information on the just before state, information whether the present high speed movement is stored in the storage unit or not, and information on the angle between directions of the present movement in the high speed and the just before high speed movement.

13. A method for controlling a device, comprising:
receiving, by a feeding motion detecting unit, an input image;
detecting, by the feeding motion detecting unit, a moving speed and a moving direction associated with a motion of a specific site of a user's body from the input image;
detecting, by the feeding motion detecting unit, whether the motion of the specific site is a feeding motion or not based on the moving speed and the moving direction; and
changing a control command of the device when the feeding motion is detected, by a main controlling unit
wherein the detecting whether the motion of the specific site is the feeding motion or not comprises:
determining that the motion of the specific site is at a high speed when the moving speed is greater than a reference speed, and to store a record of the motion of the specific site in a storage unit; and; and
determining whether the motion of the specific site is the feeding motion that is at the high speed in a predetermined direction or not.

* * * * *